United States Patent [19]

Henkel

[11] Patent Number: 4,640,587
[45] Date of Patent: Feb. 3, 1987

[54] METHOD FOR MANUFACTURING A SPECTACLE LENS FOR MYOPES

[75] Inventor: Günter Henkel, Daaden, Fed. Rep. of Germany

[73] Assignee: N.V. Optimed, Izegem, Belgium

[21] Appl. No.: 693,728

[22] Filed: Jan. 23, 1985

[30] Foreign Application Priority Data

Jun. 19, 1984 [BE] Belgium ............... PV 0/213171

[51] Int. Cl.⁴ ............................................. G02B 3/04
[52] U.S. Cl. ............................ 350/432; 51/284 R
[58] Field of Search ............... 350/168, 169, 432; 51/284 R; 264/2.7

[56] References Cited

U.S. PATENT DOCUMENTS

| | | | |
|---|---|---|---|
| 2,846,918 | 8/1958 | Miles | 350/169 |
| 3,317,640 | 5/1967 | Jones | 264/2.7 |
| 3,618,271 | 11/1971 | Martiros | 51/284 |
| 3,897,657 | 8/1975 | Smith | 51/284 R |
| 4,561,736 | 12/1985 | Furter | 350/432 |

*Primary Examiner*—Harold D. Whitehead
*Attorney, Agent, or Firm*—Scully, Scott Murphy & Presser

[57] ABSTRACT

There is described a method for manufacturing a spectacle lens for myopes the edge thickness of which may be considered as substantial, which comprises starting with a semi-machined product with a concave hollowing which extends to the edge or substantially to the edge of the lens, milling away about 40 to 51% of the lens edge thickness, and radiusing convexly thereafter the sharp angle between said concave hollowing and the plane-milled portion of the lens which surrounds said concave hollowing.

8 Claims, 7 Drawing Figures

METHOD FOR MANUFACTURING A SPECTACLE LENS FOR MYOPES

BACKGROUND OF THE INVENTION

This invention relates to a method for manufacturing a spectacle lens for myopes the edge thickness of which is markedly lowered, while some disturbing effects of such spectacle lenses with smaller edge thickness are avoided.

The object of the invention is to provide a method whereby both the aesthetic appearance of the lens is improved and the field of view of such lenses is markedly enlarged relative to other lenses with smaller edge thickness.

Spectacle lenses with a substantial edge thickness, that is a thickness from 7.3 mm to 27 mm are difficult to mount, are thereby very heavy to bear, and simultaneously very unaesthetic because due to the grinding-out of a concave hollow, there appears a very disturbing circle which also results in the well-known bull's-eye effect.

It has already been proposed to lower the lens edge thickness by using with lenses having a high refractive index, a grinding technique which does not however enlarge the field of view. A field of view from 20 to 30 mm at most, depending on the required diopter, is markedly too small. This is however the maximum field of view which is obtained by making use of a technique which is for example the basis for Swiss Patent No. 634,928.

It is further not possible to make use of such a technique for bi- or trifocal lenses, and even less for progressively-varying lenses.

As the concave lens which is machined according to the above-defined method has a too-limited aperture, whereby the locating of the patch for bi- or trifocal lens results in problems which are incompatible with the profile of the concavemachined lens, lenses for myopes treated according to said method may not be designed as bi- or trifocal lenses. This is also the reason why such lens may not be treated as progressive lens either.

SUMMARY OF THE INVENTION

To obviate such drawbacks and other ones of the techniques known up to now, one starts according to the invention, with a semi-machined lens with a concave hollowing which extends to the edge or substantially to the edge of the lens, one mills away 40% to 51% of the lens edge thickness depending on the diopter, and one radiuses convexly thereafter the sharp angle between said concave hollowing and the plane-milled portion of the lens which surrounds said concave hollowing.

The invention also pertains to spectacle lenses which are obtained according to the above-defined method.

BRIEF DESCRIPTION OF THE DRAWING

Other details and features of the invention will stand out from the following description, given by way of non limitative example and with reference to the accompanying drawings, in which.

DETAILED DESCRIPTION OF THE PREFERRED EMBODIMENTS

Spectacle lenses machined as shown in any one of FIGS. 4 to 7 have a very large field of view and this in spite of the original substantial edge thickness. The improvement of the field of view relative to lenses machined according to the above-mentioned Swiss Patent is marked.

The new field of view now reaches up to about 46 mm while spectacle lenses obtained according to said Patent have at most a field of view about 30 mm.

Such increase in the field of view is of the utmost importance, since measurings of the face angle by oculists have shown that according to the diopter myopes have an optimum face area with a field of view reaching from 46 mm for a $-7$ diopter to 29 mm for a $-21$ diopter.

This optimum face area is reached with the invention, as it appears from Table 1.

Figure 1:
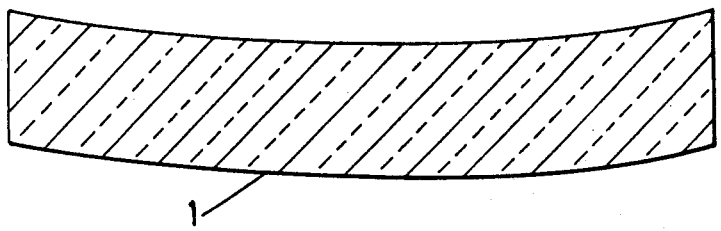
FIG. 1 is a cross-section through a semi-machined lens which is used as starting point for the manufacturing of lenses according to the invention.

With the method according to the invention, one starts from a semi-machined product, that is a spectacle lens as shown in FIG. 1. By the wording "spectacle lens" is meant here any optical material, even also a synthetic material. CR 39 and polycarbonates are some of the materials which are particularly well suitable for the working of the method according to the invention.

Figure 2:
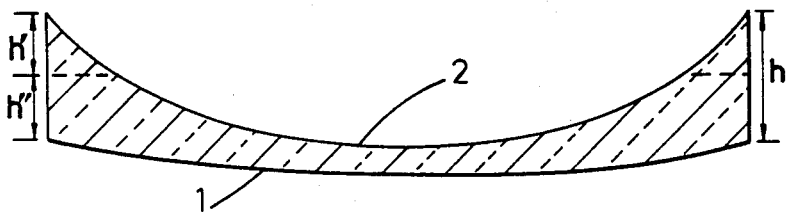
FIG. 2 is a cross-section of the same lens the inner side of which has been ground concavely away.

As the edge thickness of height h of the lens as shown in FIG. 2 is in any case too large to be easily mounted and is naturally extremely unaesthetic, the edge thickness of lens 1 with a height h' is milled away over 40% to 51% of the total edge thickness, depending on the diopter (see Table 2).

Figure 3:
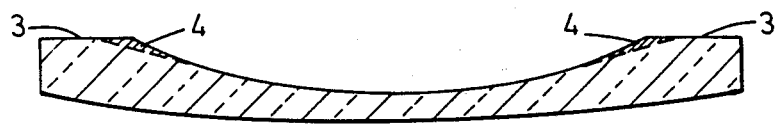
FIG. 3 is a cross-section through the lens as shown in FIG. 1, about 40% of the edge thickness of which has been milled away.

The lens which has undergone such machining then appears as shown in FIG. 3 and has an edge thickness which corresponds to a height h''. The lens aperture is thereby very large, but the angle which is formed between the concave portion 2 of lens 1 and the surrounding flat portion 3 still causes the disturbing bull's-eye effect.

This is obviated by radiusing convexly said sharp edge. The portion to be radiused convexly corresponds substantially to that area which is shown by reference numeral 4 (FIG. 4).

Figure 4:
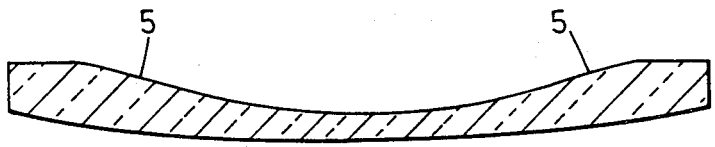
FIG. 4 is a cross-section through a lens as shown in FIG. 3 the angle between the concave center portion and the edge area connecting thereto of which has been convexly radiused and thereafter polished.

After machine milling-away, the end product shows in cross-section the shape which corresponds to FIG. 4. The field of view 2 remains large and merges in a circumferential flattened margin area 3 due to the convex milling-away of the area which corresponds in the end product to the arc-shaped portion 5.

Due to such machining of the spectacle lenses, the disturbing and unaesthetic circle which is visible on the lens outer side and which causes said bull's-eye effect, disappears.

The very large field of view of the product from which one normally starts according to the invention, is retained as it appears from FIGS. 4 to 7.

Figure 5:
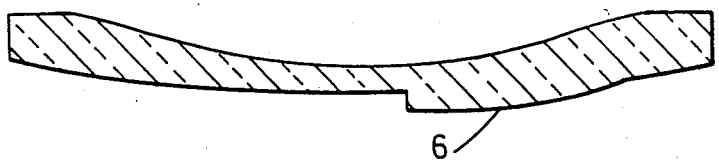
FIG. 5 is a cross-section through a bifocal lens which has been machined on the inner side according to the method of the invention.
Figure 6:
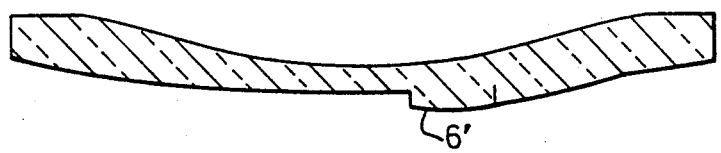
FIG. 6 is a cross-section similar to FIG. 5, but pertaining to a trifocal lens.

In FIGS. 5 and 6, there are shown cross-sections of spectacle lenses for bifocal and trifocal lenses respectively, the inner side of which has been machined according to the method of the invention.

Figure 7:
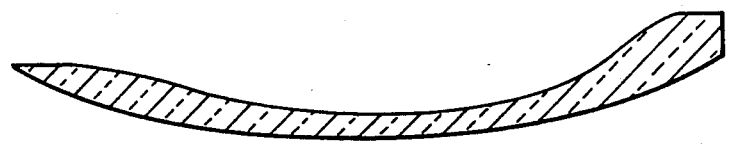
FIG. 7 is a cross-section through a so-called progressive lens the inner side of which has been machined according to the method of the invention.

In bi- and trifocal lenses, a patch 6, 6' respectively is incorporated, the position thereof in the lens may be called compatible with the large field of view which is retained in a lens machined according to the method of the invention. The cross-section as shown in FIG. 7 which pertains to a so-called progressive lens, also shows clearly that such lenses may be machined on the inner side according to the same method.

As it appears from the above description of said method and of the spectacle lenses obtained therewith, the possibility is given by starting from a semi-machined product with a substantial edge thickness, to obtain lenses which are aesthetically valid, insure a large field of view, are easy to mount in the machined condition thereof, and are markedly lighter to wear.

There are given hereinafter by way of illustration, Tables 1 and 2 which show respectively the optically-useful field of view and a comparison table for the edge thickness.

TABLE 1

| Optically-useful field of view | |
| --- | --- |
| Diopter | Field of view |
| −7.00 | 46 |
| −8.00 | 46 |
| −9.00 | 46 |
| −10.00 | 45 |
| −11.00 | 44 |
| −12.00 | 44 |
| −13.00 | 41 |
| −14.00 | 39 |
| −15.00 | 38 |
| −16.00 | 36 |
| −17.00 | 35 |
| −18.00 | 33 |
| −19.00 | 32 |
| −20.00 | 30 |
| −21.00 | 29 |

TABLE 2

| Comparison table for edge thickness | | | |
| --- | --- | --- | --- |
| Diopter | Normal edge thickness (mm) | Edge thickness when using the invention | Reducing percentage | Actual reducing (mm) |
| 400 | 7.3 | 4.4 | 40 | 2.9 |
| 425 | 7.6 | 4.6 | 40 | 3.0 |
| 450 | 7.9 | 4.8 | 40 | 3.1 |
| 475 | 8.2 | 5.0 | 40 | 3.2 |
| 500 | 8.5 | 5.1 | 40 | 3.4 |
| 525 | 8.8 | 5.3 | 40 | 3.5 |
| 550 | 9.0 | 5.4 | 40 | 3.6 |
| 575 | 9.3 | 5.6 | 40 | 3.7 |
| 600 | 9.6 | 5.8 | 40 | 3.8 |
| 625 | 9.9 | 6.0 | 40 | 3.9 |
| 650 | 10.1 | 6.1 | 40 | 4.0 |
| 675 | 10.5 | 6.3 | 40 | 4.2 |
| 700 | 10.8 | 6.5 | 40 | 4.3 |
| 725 | 11.0 | 6.6 | 40 | 4.4 |
| 750 | 11.3 | 6.8 | 40 | 4.5 |
| 775 | 11.6 | 7.0 | 40 | 4.6 |
| 800 | 11.9 | 7.1 | 40 | 4.8 |
| 825 | 12.2 | 7.3 | 40 | 4.9 |
| 850 | 12.5 | 7.5 | 40 | 5.0 |
| 875 | 12.8 | 7.7 | 40 | 5.1 |
| 900 | 13.1 | 7.9 | 40 | 5.2 |
| 925 | 13.4 | 8.1 | 40 | 5.3 |
| 950 | 13.7 | 8.2 | 40 | 5.5 |
| 975 | 14.0 | 8.4 | 40 | 5.6 |
| 1000 | 14.2 | 8.5 | 40 | 5.7 |
| 1025 | 14.5 | 8.6 | 41 | 5.9 |
| 1050 | 14.8 | 8.7 | 41 | 6.1 |
| 1075 | 15.1 | 8.9 | 41 | 6.2 |
| 1100 | 15.4 | 9.1 | 41 | 6.3 |
| 1125 | 15.7 | 9.1 | 42 | 6.6 |
| 1150 | 16.3 | 9.5 | 42 | 6.7 |
| 1175 | 16.3 | 9.5 | 42 | 6.8 |
| 1200 | 16.6 | 9.6 | 42 | 7.0 |
| 1225 | 16.9 | 9.6 | 43 | 7.3 |
| 1250 | 17.1 | 9.7 | 43 | 7.4 |
| 1275 | 17.4 | 9.9 | 43 | 7.5 |
| 1300 | 17.7 | 10.1 | 43 | 7.6 |
| 1325 | 18.0 | 10.1 | 44 | 7.9 |
| 1350 | 18.3 | 10.3 | 44 | 8.0 |
| 1375 | 18.6 | 10.4 | 44 | 8.2 |
| 1400 | 18.9 | 10.6 | 44 | 8.3 |
| 1425 | 19.2 | 10.6 | 45 | 8.6 |
| 1450 | 19.5 | 10.7 | 45 | 8.8 |
| 1475 | 19.8 | 10.9 | 45 | 8.9 |
| 1500 | 20.1 | 11.1 | 45 | 9.0 |
| 1525 | 20.3 | 11.0 | 46 | 9.3 |
| 1550 | 20.6 | 11.1 | 46 | 9.5 |
| 1575 | 20.9 | 11.3 | 46 | 9.6 |
| 1600 | 21.2 | 11.5 | 46 | 9.7 |
| 1625 | 21.5 | 11.4 | 47 | 10.1 |
| 1650 | 21.8 | 11.6 | 47 | 10.2 |
| 1675 | 22.1 | 11.7 | 47 | 10.4 |
| 1700 | 22.4 | 11.9 | 47 | 10.5 |
| 1725 | 22.7 | 11.8 | 48 | 10.9 |
| 1750 | 23.0 | 12.0 | 48 | 11.0 |
| 1775 | 23.2 | 12.1 | 48 | 11.1 |
| 1800 | 23.5 | 12.2 | 48 | 11.3 |
| 1825 | 23.8 | 12.1 | 49 | 11.7 |
| 1850 | 24.1 | 12.3 | 49 | 11.8 |
| 1875 | 24.4 | 12.4 | 49 | 12.0 |
| 1900 | 24.7 | 12.6 | 49 | 12.1 |
| 1925 | 25.0 | 12.5 | 50 | 12.5 |
| 1950 | 25.3 | 12.7 | 50 | 12.6 |
| 1975 | 25.6 | 12.8 | 50 | 12.8 |
| 2000 | 25.9 | 12.9 | 50 | 13.0 |
| 2025 | 26.2 | 12.8 | 51 | 13.4 |
| 2050 | 26.4 | 12.9 | 51 | 13.5 |
| 2075 | 26.7 | 13.1 | 51 | 13.6 |
| 2100 | 27.0 | 13.2 | 51 | 13.8 |

I claim:

1. A method for manufacturing an optical lens for myopes comprising the steps of:
   starting with a semi-machined lens including (i) an outside edge having a substantial thickness, and (ii) an interior portion having a field of view and a central outwardly concave surface extending at least substantially to the outside edge;
   milling away about 40 to 51% of the thickness of the outside edge to form (i) a milled annular surface extending around the central concave surface, and (ii) an internal annular edge radially located between the milled surface and the central concave surface; and
   machining away the internal edge to form an outwardly convex annular surface located outside the field of view and radially extending smoothly from the milled surface to the central concave surface.

2. A method according to claim 1 wherein the starting step includes the step of using a synthetic material as the semi-machined lens.

3. A method according to claim 1 wherein the starting step includes the step of using a mineral material as the semi-machined lens.

4. A method according to claim 1 wherein the machining step includes the steps of:
forming the convex surface and the milled surface with a common first peripheral border and with equal radial slopes at the first peripheral border; and
forming the convex surface and the central concave surface with a common second peripheral border and with equal radial slopes at the second peripheral border.

5. A method according to claim 4, wherein the concave surface has a uniform radius of curvature, and the field of view is 46 mm wide.

6. An optical lens comprising:
a body having first and second opposite sides, the first side including
(i) a central outwardly concave surface,
(ii) an annular outside milled surface spaced from and extending around the central concave surface, and
(iii) an annular outwardly convex surface extending around the central concave surface and inside the milled surface, and radially smoothly extending from the concave surface to the milled surface;
the lens having a diopter between −21 and −7, and a field of view from 29 mm to 46 mm, and the outwardly convex surface being located outside the field of view.

7. An optical lens according to claim 6 wherein:
the convex surface and the milled surface have a common first peripheral border and equal radial slopes at the first peripheral border; and
the convex surface and the central concave surface have a common second peripheral border and equal radial slopes at the second peripheral border.

8. An optical lens according to claim 7, wherein the concave surface has a uniform radius of curvature, and the field of view is 46 mm wide.

* * * * *